Feb. 6, 1923.

C. J. ROGERS.
TELEGRAPH RELAY.
FILED FEB. 7, 1920.

1,444,555.

INVENTOR
Clarence J. Rogers
BY
ATTORNEYS.

Patented Feb. 6, 1923.

1,444,555

UNITED STATES PATENT OFFICE.

CLARENCE JOHN ROGERS, OF MORRIS, OKLAHOMA, ASSIGNOR TO GREAT WESTERN ELECTRIC COMPANY, OF MORRIS, OKLAHOMA, A CORPORATION OF OKLAHOMA.

TELEGRAPH RELAY.

Application filed February 7, 1920. Serial No. 356,843.

*To all whom it may concern:*

Be it known that I, CLARENCE JOHN ROGERS, a citizen of the United States, and a resident of Morris, in the county of Okmulgee and State of Oklahoma, have invented certain new and useful Improvements in Telegraph Relays, of which the following is a specification.

My invention relates to improvements in telegraph relays, and it consists in the constructions, combinations and arrangements herein described and claimed.

One of the foremost objects of the invention is to provide a telegraph relay, employing differentially wound transmitting coils which are particularly adapted for use on "leaky" lines.

Another object of the invention is to provide a telegraph relay employing differentially wound transmitting magnets, or in other words, magnets on the cores of which there are separate windings of different cubical content of wire of the same gauge, the use of such magnets resulting in a very prompt armature action.

Other objects and advantages will appear in the following specification, reference being had to the accompanying drawing, in which:—

Figure 1:
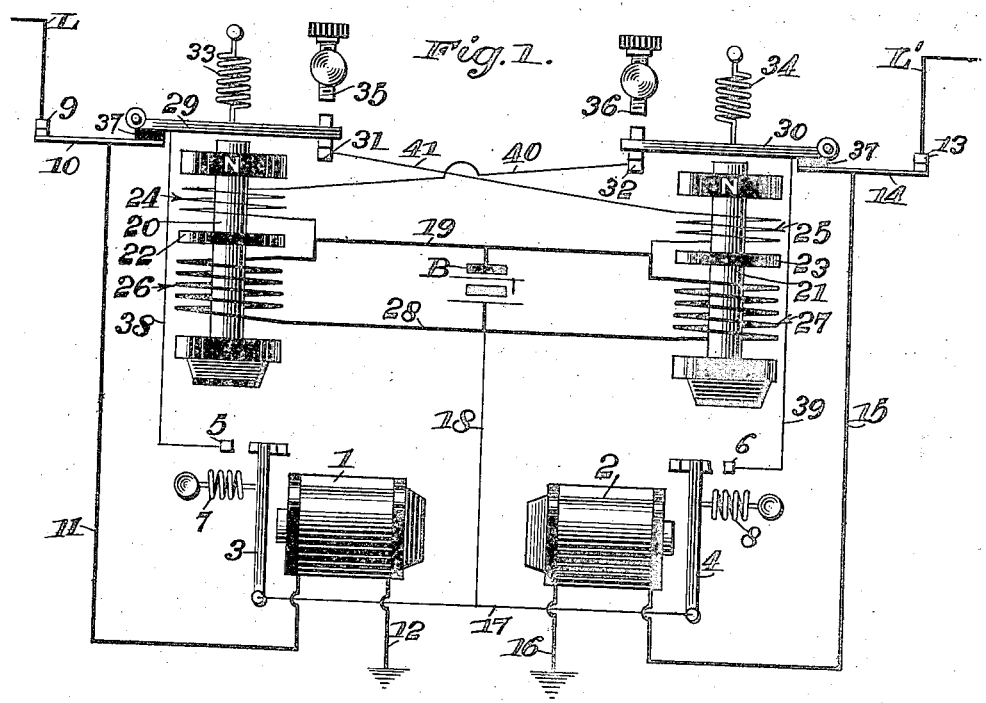
Figure 2:
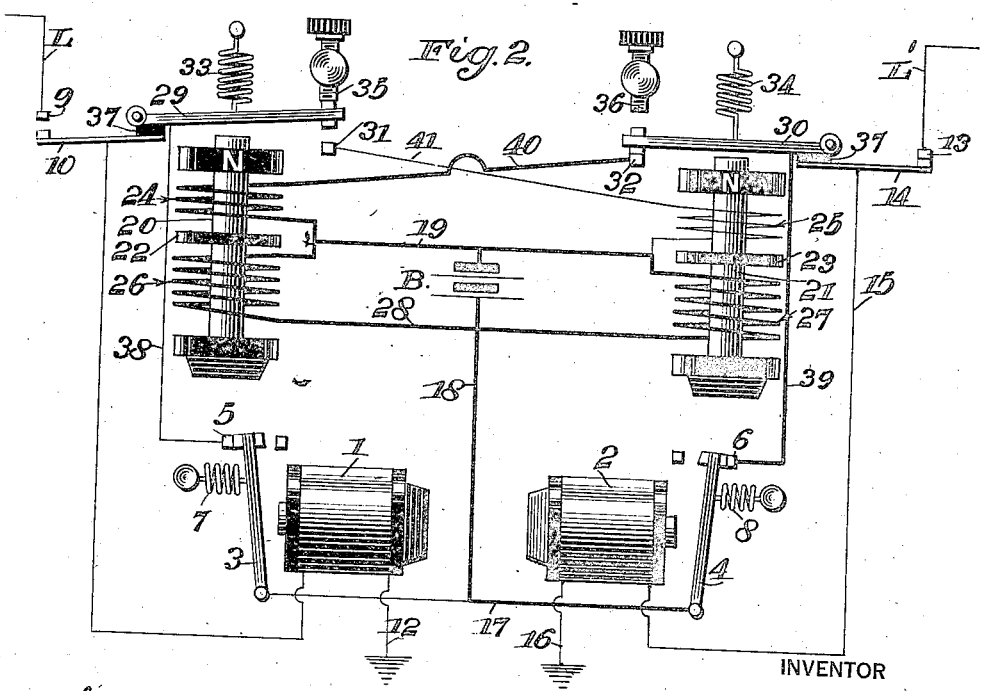

Figure 1 is a diagram illustrating the mechanism and wiring connections of the improved relay when the telegraph line is closed, and Figure 2 is a similar view illustrating the change in position of the parts when the line is opened.

The general construction can be observed at a glance in Figure 1, wherein 1 and 2 are two ordinary neutral relays, respectively with armatures 3 and 4 arranged to engage contacts 5, 6, which when engaged cause the completion of a local circuit on one or the other side of the instrument, depending on which armature has moved on the back stroke. It is thus to be observed that the local circuits are closed on the back strokes of the armatures.

Springs 7 and 8, which may be made adjustable, exert tension on the armatures 3, 4 in opposition to the magnetic influence on the same armatures when the relays are energized as they are under normal conditions. Under such conditions, current flows thus: line L, over which current flows from some remote point, fixed contact 9, movable spring contact 10, wire 11 to relay 1, wire 12 to ground, and through the ground back to the remote source of energy.

The other relay 2 is similarly energized by current from the line L', fixed contact 13, spring contact 14, wire 15 to relay 2 and over wire 16 to ground and from thence back to the companion remote source of energy.

A wire 17 joins the armatures 3, 4, a branch wire 18 running from the wire 17 to the negative pole of the battery B, continuing from the positive pole of the battery to the common wire 19 which connects the windings on the two transmitting sounders which are identified below by reference to the cores 20, 21. Having reached this point, the construction of the transmitting sounders 20 and 21 should be understood. The cores are suitably mounted in a manner which experience proclaims to be best, and the cores are respectively divided by spacers 22, 23 so as to provide compartments for the coils 24 and 25, and relatively larger compartments for the coils 26, 27.

Under normal circumstances, considering the condition in Figure 1 to be normal, current flows from the positive pole of the battery B over wire 19 to the coils 26, 27, returning to the negative pole of the battery over wire 28, thus strongly magnetizing the cores 20, 21 and holding the transmitting armatures 29 and 30 attracted against the back stop 31, 32.

The windings 26, 27 are such that when current passes through a north pole is established at the core ends next to the armatures 29, 30. As appears under the description of the operation, when the companion small coil 24 or 25 of either of the transmitting sounders is energized in addition to the large coil on the same core, then the magnetic influence is neutralized so that the armature thus affected is permitted to be withdrawn by one or the other of the springs 33, 34. There is an adjustable front stop 35, 36 for the respective armatures. An insulating piece 37 separates the movable spring contacts 10, 14 from the respective armatures 29, 30, by which the spring contacts are carried.

Wires 38, 39 join the armature 29 with the back stop 5, and the armature 30 with the back stop 6 respectively. A wire 40 connects the coil 24 with the back stop 32, while a wire 41 connects the coil 25 with the back stop 31.

*The operation.*

As explained immediately above in connection with Figure 1, a normal condition exists when the ordinary relays 1 and 2 are energized by the passage of the closed line currents, at which time the companion armatures 3 and 4 are attracted from the local back stops 5 and 6.

Under the same circumstances, the coils 26 and 27 of the differential transmitting sounders 20, 21, are energized by the passage of current from the battery B, so that the companion armatures 29, 30 are attracted, and by such attraction maintaining the closure of the line-controlling contacts 9, 10 and 13, 14. It is to be observed that at this time the coils 24, 25 are de-energized, because it requires the displacement of one or the other of the relay armatures 3, 4 from the attracted positions shown, before the local circuit can be closed through either coil 24, 25.

Assume now that the operator at the end of the line L' desires to send. He accordingly opens his key whereupon the current energizing the relay 2, is broken and the armature 4 flies back against the back stop 6 by virtue of the tension of the spring 8. The position of the parts illustrated in Figure 2, is immediately assumed.

In addition to current flowing from both coils 26, 27 from the battery B, current additionally flows through coil 24 from the positive pole of the battery B and over wire 19, then over wire 40 to back stop 32, through armature 30, over wire 39 to back stop 6, through armature 4, wires 17 and 18 back to the negative pole of the battery. The energization of the coil 24 causes the neutralization of the magnetism in the core 20 which formerly held the armature 29 attracted, and therefore the armature 29 is released so that the line-controlling contacts 9, 10 at the left are separated and current then no longer flows into the instrument from the line L at the left.

The neutralizing effect of the magnetism in the core 20 occurs by reason of the fact that the winding of the coil 24 is opposite to that of the coil 26, and consequently when current flows through both, there is a tendency to establish both a north and south pole at the front end of the core, both of which cannot be maintained at the same time, and consequently there is this peculiar neutralizing effect on the magnetism, referred to at the beginning.

It is to be additionally observed that the release of the armature 29 occurs quickly enough to prevent the passage of current through the coil 25 of the transmitting magnet at the right, which passage would certainly occur upon the release of the armature 3 by the deenergizing of the line L, and the consequent closure of the second local circuit which is controlled by the armature 3 and the back stop 5. But as stated, the action of the armature 29 is so quick, and in fact, occurs simultaneously with the release of the armature 3, so that the armature 30 at the right remains in the attracted position against the back stop 32 instead of being permitted to retract as it would do were the magnetism of the core 21 neutralized by the passage of current through the coil 5.

Successive opening and closing of the sending key at the end of the sending line L', causes the successive deenergization and energization of the relay 2 and consequently the sympathetic movement of the armature 29 of the transmitting sounder 20. As long as the sending over the line L' continues, the armature 30 remains in the attracted position, it being the armature 29 which oscillates in continuing the sending function. When both main line circuits are closed, both transmitter armatures 29, 30 are attracted or closed, since no local current from the battery B can then pass through the coils 24, 25 to release the armatures by the magnetic neutralizing effect described above.

When both main line currents are open, as in Figure 2, only one of the transmitter armatures can occupy the closed or attracted position, this being perfectly obvious from Figure 2 and the foregoing description in connection therewith. Experience has demonstrated that this novel arrangement of the repeater is particularly adapted for use on " leaky " lines, the fact that the transmitting armature in either case being controlled by an independent and local source of current, constituting what might be called " ample margin " which makes for the positiveness of the sending or relayed impulse from the instrument to the other line.

While the construction and arrangement of the improved telegraph repeater as herein described and claimed is that of a generally preferred form, obviously modifications and changes can be made without departing from the spirit of the invention or the scope of the claim.

I claim :—

A telegraph repeater, comprising a pair of transmitter magnets, each with separate windings of which one is larger than the other; connections joining the two large windings; a local battery joining said connections normally energizing both large windings to normally attract magnet armatures which include spring contacts thereby closing oppositely entering lines; a relay companion to each transmitter magnet, in circuit with the respective entering lines, being thereby energized to attract cooperating armatures, each with back stops having connections to the transmitter armatures; and connections from the small coils crossing over to back stops engaged by the armatures of the transmitter magnets, a break in one of the lines deenergizing the companion relay for the release of the cooperating armature and consequent completion of a local circuit from the battery through the small coil of the opposite transmitter magnet and the armature of the companion transmitter magnet, thereby neutralizing the magnetism of said opposite transmitter magnet and enabling the release of the companion armature for the breaking of the companion line.

CLARENCE JOHN ROGERS.